US012055068B2

(12) United States Patent
Banhos et al.

(10) Patent No.: US 12,055,068 B2
(45) Date of Patent: Aug. 6, 2024

(54) AIRFOIL LEADING EDGE VENTURI COOLING PASSAGE

(71) Applicant: RTX CORPORATION, Farmington, CT (US)

(72) Inventors: Jonas Banhos, West Hartford, CT (US); Ravon Venters, Farmington, CT (US); Russell Kim, Temecula, CA (US); Raymond Surace, Newington, CT (US); James T. Roach, Vernon, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/244,469

(22) Filed: Sep. 11, 2023

(65) Prior Publication Data

US 2024/0052749 A1 Feb. 15, 2024

Related U.S. Application Data

(62) Division of application No. 17/887,870, filed on Aug. 15, 2022, now Pat. No. 11,788,419.

(51) Int. Cl.
*F01D 5/28* (2006.01)
*F01D 5/18* (2006.01)

(52) U.S. Cl.
CPC ............. *F01D 5/187* (2013.01); *F01D 5/282* (2013.01); *F01D 5/284* (2013.01); *F05D 2240/121* (2013.01); *F05D 2240/303* (2013.01); *F05D 2300/6033* (2013.01)

(58) Field of Classification Search
CPC .......... F01D 5/187; F01D 5/282; F01D 5/284; F01D 5/147; F05D 2240/121; F05D 2240/303; F05D 2300/6033; B32B 18/00; B32B 2603/00; C04B 2237/38
See application file for complete search history.

(56) References Cited

U.S. PATENT DOCUMENTS

| | | | | |
|---|---|---|---|---|
| 4,565,490 | A | 1/1986 | Rice | |
| 8,016,563 | B1 | 9/2011 | Liang | |
| 9,995,173 | B2 | 6/2018 | Castaneda et al. | |
| 10,273,813 | B2 * | 4/2019 | Kittleson | C04B 35/597 |
| 10,724,387 | B2 | 7/2020 | Farrar et al. | |
| 10,815,806 | B2 | 10/2020 | Correia et al. | |
| 11,242,991 | B2 * | 2/2022 | Clark | F01D 25/246 |

(Continued)

FOREIGN PATENT DOCUMENTS

WO 2019045671 A1 3/2019

OTHER PUBLICATIONS

European Search Report for European Application No. 23191407.8 mailed Jan. 18, 2024.

*Primary Examiner* — Eldon T Brockman
(74) *Attorney, Agent, or Firm* — Carlson, Gaskey & Olds, P.C.

(57) ABSTRACT

A ceramic matrix composite airfoil includes a high-pressure surface and a low-pressure surface connected at a leading edge and a trailing edge. The high-pressure surface and the low-pressure surface extend from a first end to a second end. A leading edge cooling passage includes an inlet portion, a midspan portion and an outlet portion. A cross-sectional flow area of the midspan portion is less than a cross-sectional flow area of either the inlet portion or the outlet portion.

16 Claims, 8 Drawing Sheets

(56) References Cited

U.S. PATENT DOCUMENTS

| | | | |
|---|---|---|---|
| 11,359,494 | B2 | 6/2022 | Osgood et al. |
| 11,396,814 | B2 * | 7/2022 | Barker .................. B29C 33/485 |
| 11,473,444 | B2 | 10/2022 | Generale et al. |
| 2005/0158171 | A1 * | 7/2005 | Carper .............. C04B 35/62868 415/200 |
| 2019/0186268 | A1 | 6/2019 | Hjalmarsson et al. |
| 2021/0140341 | A1 | 5/2021 | Generale et al. |

* cited by examiner

AIRFOIL LEADING EDGE VENTURI COOLING PASSAGE

REFERENCE TO RELATED APPLICATION

This application is a Divisional of U.S. application Ser. No. 17/887,870 filed on Aug. 15, 2022.

TECHNICAL FIELD

The present disclosure relates generally to a ceramic composite material airfoil with shaped cooling passages for improving heat transfer at a leading edge.

BACKGROUND

Airfoils are utilized throughout a turbine engine, including sections generating significant heat. Cooling air is provided in airfoils exposed to extreme temperatures. Moreover, ceramic matrix composite materials are utilized to further enable operation at extreme temperatures. Temperature differences between hot engine core gas flows and cooling airflows can be dramatic and generate high thermal stresses. Cooling airflow is taken from other portions of the gas turbine engine and can reduce engine efficiency. High thermal stresses can limit operating temperatures and increase the amount of cooling air required for desired engine operation.

Turbine engine manufacturers continue to seek further improvements to engine performance including improvements to reduce environmental impact while improving propulsive efficiencies.

SUMMARY

A ceramic matrix composite airfoil according to one example disclosed embodiment includes, among other possible things, a high-pressure surface and a low-pressure surface connected at a leading edge and a trailing edge. The high-pressure surface and the low-pressure surface extend from a first end to a second end. A leading edge cooling passage includes an inlet portion, a midspan portion and an outlet portion. A cross-sectional flow area of the midspan portion is less than a cross-sectional flow area of either the inlet portion or the outlet portion.

In a further embodiment of the foregoing, the cross-sectional flow area in the inlet portion continually decreases from the first end to the midspan portion.

In a further embodiment of any of the foregoing, the cross-sectional flow area in the outlet portion continually increases from the midspan portion to the second end.

In a further embodiment of any of the foregoing, the ceramic matrix composite airfoil includes a forward rib that defines a wall of the leading edge cooling passage. The forward rib is spaced apart from the leading edge.

In a further embodiment of any of the foregoing, the forward rib is disposed at a non-normal angle relative to the leading edge within the inlet portion and the outlet portion.

In a further embodiment of any of the foregoing, the forward rib is parallel with the leading edge within the midspan portion.

In a further embodiment of any of the foregoing, the ceramic matrix composite airfoil includes another cooling air passage that is disposed on a side of the forward rib opposite the leading edge cooling passage.

In a further embodiment of any of the foregoing, the ceramic matrix composite airfoil includes an aft rib that is spaced apart from the forward rib. The aft rib defines a trailing edge cooling passage and a portion of a center cooling air passage.

In a further embodiment of any of the foregoing, the airfoil is part of stator blade.

In a further embodiment of any of the foregoing, the airfoil is part of a rotor blade.

A mandrel assembly for forming ceramic matrix composite airfoil, the mandrel assembly according to another example disclosed embodiment includes, among other possible things, a leading edge mandrel assembly that includes a first part and a second part. Each of the first part and the second part include an end portion and a midspan portion. The end portion includes an increasing width in a direction away from the midspan portion. A center mandrel assembly includes a nested part and a main part. The mandrel assembly further includes a trailing edge mandrel.

In a further embodiment of the foregoing, the nested part fits within a space that is defined between end portions of the first part and the second part of the leading edge mandrel.

In a further embodiment of any of the foregoing, the first nested part includes a first side, a middle and a second side. The first side and the second side include an increasing width in a direction toward the middle.

In a further embodiment of any of the foregoing, the first part and the second part are identically shaped.

A method of forming a ceramic matrix composite (CMC) airfoil according to another example disclosed embodiment includes, among other possible things, applying a leading edge braiding over a leading edge mandrel assembly with a ceramic fiber material. The leading edge mandrel assembly includes a first part and a second part. Each of the first part and the second part include an end portion and a midspan portion. The end portion includes an increasing width in a direction away from the midspan portion. A center braiding is applied over a center mandrel assembly with a ceramic fiber material. The center mandrel assembly includes a nested part and a main part. A trailing edge braiding is applied over a trailing edge mandrel. An overwrap braiding is applied over the leading edge mandrel assembly, the center mandrel assembly, and the trailing edge mandrel. The CMC material is densified. The method further includes removing the leading edge mandrel assembly, the center mandrel assembly, and the trailing edge mandrel.

In a further embodiment of the foregoing, applying the center braiding further includes applying the center braiding over the leading edge braiding and over a portion of the center mandrel assembly.

In a further embodiment of any of the foregoing, applying the overwrap braiding includes applying the overwrap over the center braiding that is wrapped around both the leading edge mandrel assembly and the center mandrel assembly and the braided trailing edge mandrel.

In a further embodiment of any of the foregoing, removing the leading edge mandrel assembly includes pulling each of the first part and the second part out opposite ends.

In a further embodiment of any of the foregoing, removing the center mandrel assembly includes removing the main part through an opening followed by moving the center part into the space vacated by the main part and removing the nested part through the same opening through which the main part was removed.

In a further embodiment of any of the foregoing, the main part and the nested part include more than one identically shaped part.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
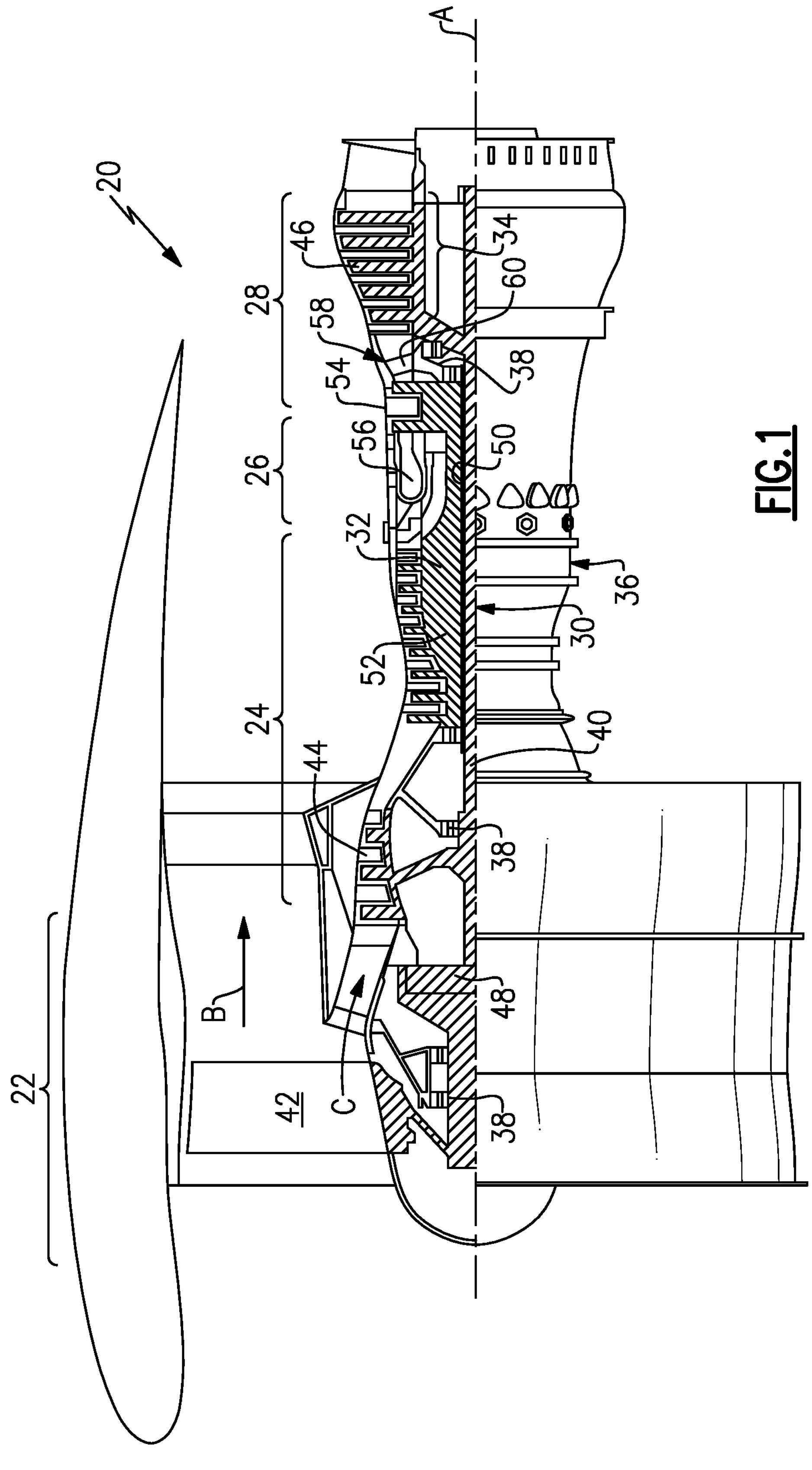
FIG. 1 is a schematic view of an example turbine engine embodiment.

FIG. 1 schematically illustrates an example turbine engine embodiment 20. Ceramic composite materials (CMC) are capable of withstanding higher temperatures than similarly configured metal structures. The higher temperature capability of CMC materials makes it suitable for use in high temperature sections of the engine 20. The higher temperature capability may reduce the amount of cooling airflow required to provide a desired operating capability. Improvements in heat transfer provided by a cooling airflow can further enhance the capabilities and benefits of using CMC materials. Example CMC airfoil structures of this disclosure include features that enhance heat transfer capabilities of the cooling airflow to further enhance operational temperature capabilities.

The example gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 18, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan section 22 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 58 of the engine static structure 36 is arranged generally between the high pressure turbine 54 and the low pressure turbine 46. The mid-turbine frame 58 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 58 includes airfoils 60 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle.

The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram}\ ^\circ\ \text{R})/(518.7^\circ\ \text{R})]^{0.5}$. The "Low corrected fan tip speed" as disclosed herein according to one non-limiting embodiment is less than about 1150 ft/second (350.5 meters/second).

The example gas turbine engine includes the fan section 22 that comprises in one non-limiting embodiment less than about twenty-six (26) fan blades 42. In another non-limiting embodiment, the fan section 22 includes less than about twenty (20) fan blades 42. Moreover, in one disclosed embodiment the low pressure turbine 46 includes no more than about six (6) turbine rotors schematically indicated at 34. In another non-limiting example embodiment, the low pressure turbine 46 includes about three (3) turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

Figure 2:
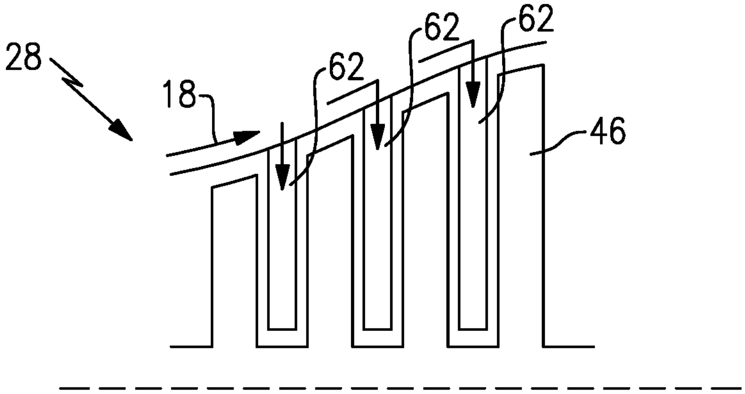
FIG. 2 is as schematic view of a portion of an example turbine section embodiment.

Referring to FIG. 2 with continued reference to FIG. 1, a portion of the turbine section 28 is schematically shown and includes stator blades 62 disposed between the rotor blades 46. The stator blades 62 include an airfoil that directs the gas flow between rotor stages through the turbine section 28. Accordingly, the rotor blades 46 and the stator blades 62 are exposed to extreme temperatures. A cooling air flow 18 is provided to cool the rotor blades 46 and the stator blades 62 to enable operation at desired temperatures. The use of ceramic matric composite material (CMC), in addition to the cooing airflow 18, enhances temperature capability of the rotor blades and the stator blades 62. Temperature differences between the hot engine core gas flow and the cooling air flow may exceed 1000 F. The extreme temperature differential can generate areas of high heat load. A disclosed CMC airfoil embodiment includes features for improving heat transfer in targeted high heat load regions. The disclosed CMC airfoil forms is part of either or both the rotor blades 46 and the stator blades 62.

Figure 3:
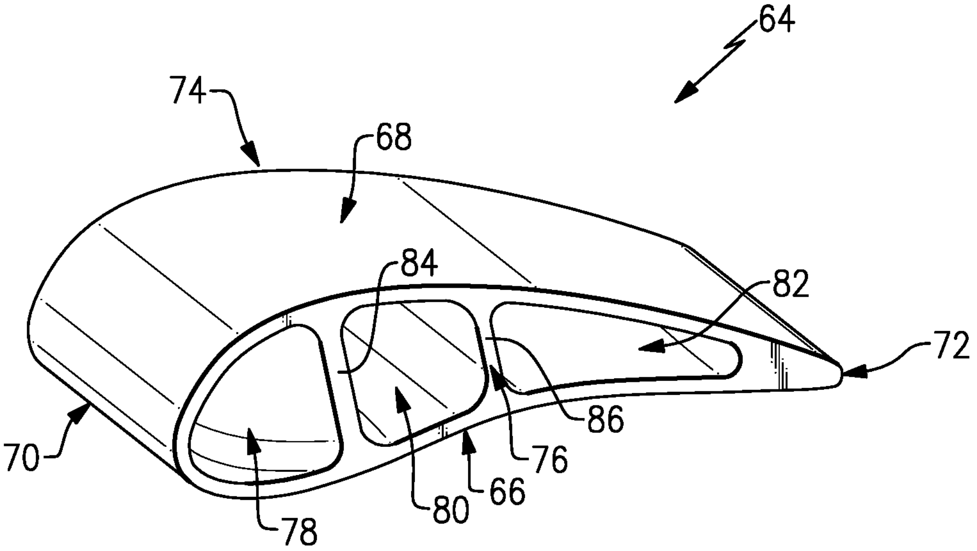
FIG. 3 is a perspective view of an example airfoil embodiment.
Figure 4:
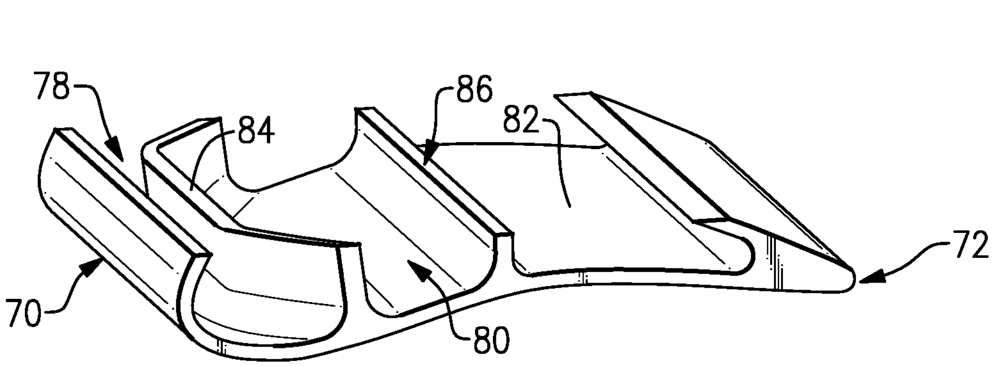
FIG. 4 is a sectional view of an example airfoil embodiment.

Referring to FIGS. 3 and 4, an example airfoil 64 of an example stator blade 62 is shown. It should be appreciated that although a turbine stator blade 62 is shown and described by way of example, the disclosed example airfoil 64 may be utilized as part of the rotor blades 42 and/or in other sections of the turbine engine 20. Moreover, the example airfoil 64 may also be incorporated in as part of a rotating part such as a rotor blade within the turbine section 28 and/or compressor section 24.

The airfoil 64 includes a high pressure surface 66, a low pressure surface 68 that meet at a leading edge 70 and at a trailing edge 72. The high pressure surface 66 and low pressure surface 68 extend between the leading edge 70, the trailing edge 72, a first end 74 and a second end 76. Passages for cooling air are provided through the airfoil 64 between the first end 74 and the second end 76. Platforms are not shown at the first end 74 or the second end 76 but may be included depending on the application for the airfoil 64. Such platforms may be provided as either integral or separate parts of a blade incorporating the example disclosed airfoil embodiment. In one disclosed embodiment, the airfoil 64 includes a leading edge cooling passage 78, a center cooling passage 80 and a trailing edge cooling passage 82.

A forward rib 84 divides the leading edge cooling passage 78 from the enter cooling passage 80. An aft rib 86 divides the center cooling passage 80 from the trailing edge cooling passage 82. The forward rib 84 and the aft rib 86 are integral structures of the CMC airfoil 64 that provide structure to the completed airfoil.

The leading edge cooling passage 78 includes a converging diverging configuration to increase cooling air velocity through a targeted region of the leading edge 70. The forward rib 84 is shaped to decrease flow area along the outer wall proximate the leading edge within a defined region. The decreased flow area provides an increase in cooling air velocity that in turn increases the transfer of heat from the leading edge 70.

Figure 5:
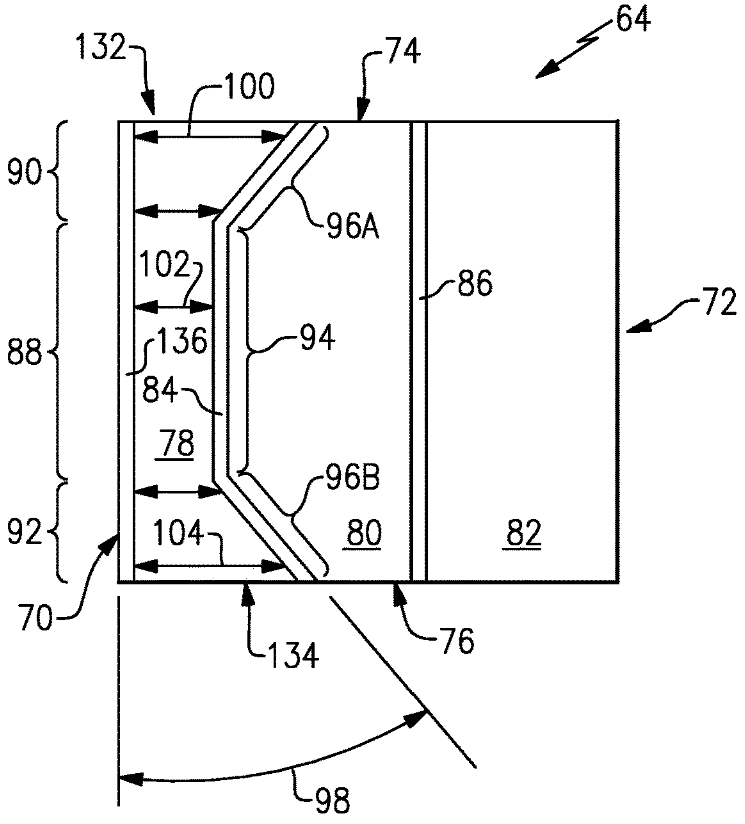
FIG. 5 is another sectional view of an example airfoil embodiment.
Figure 6:
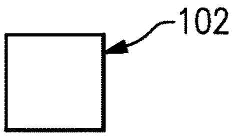
FIG. 6 is a cross-sectional view of a flow area through a portion of a cooling passage of the airfoil.
Figure 7:
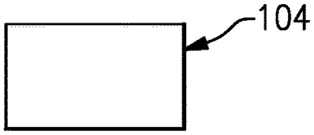
FIG. 7 is a cross-sectional view of another flow area through a portion of a cooling passage of the airfoil.

Referring to FIGS. 5, 6 and 7 with continued reference to FIGS. 3 and 4, the leading edge cooling passage 78 includes a first end portion 90, a second end portion 92 and a midspan portion 88. In this example the first end portion 90 provides for an inlet of cooling airflow and the second end portion provides an outlet for cooling airflow. The surface of the leading edge 70 that corresponds with the midspan portion 88 typically operates at the highest temperatures. The example leading edge cooling passage 78 targets improved heat transfer in the midspan portion 88 to accommodate the higher heat loads.

The increased velocity of cooling airflow within the midspan portion 88 is provided by a decreasing flow area 100 beginning at an inlet 132 and continually decreasing toward the midspan portion 88. The midspan portion 88 includes a uniform flow area 102 (FIG. 6) that extends from the first end portion 90 to the second end portion 92. The second end portion 92 includes an increasing flow area 104 that increases in a direction away from the midspan portion 88 to the outlet 134 at the second end 76 of the airfoil 64.

A forward wall 136 that forms the leading edge 70 is substantially linear from the first end 74 to the second end 76 of the airfoil 64 to follow any contours of the leading edge 70. The forward rib 84 provides for the decreasing and increasing flow areas through the leading edge passage 78. In one disclosed example, the forward rib 84 includes a middle wall portion 94 and end wall portions 96A-B. The end portions 96A-B angle away from the middle wall portion 94 and the leading edge 70 at an angle 98 relative to the leading edge 70. The angle 98 is a non-normal angle that provides a desired transition between the flow area 102 in the midspan portion 88 and the end portions 90, 92. In one example disclosed embodiment, the angle 98 is between 20° and 70°. In another disclosed embodiment, the angle 98 is between 35° and 55°. In another disclosed embodiment, the angle 98 is 45° degrees.

Although the end wall portions 96A-B are disclosed by way of example as substantially straight angled walls, the end wall portions 96A-B may be curved to provide a non-linear decrease and increase in flow area transition to and from the midspan portion 88.

Figure 8:
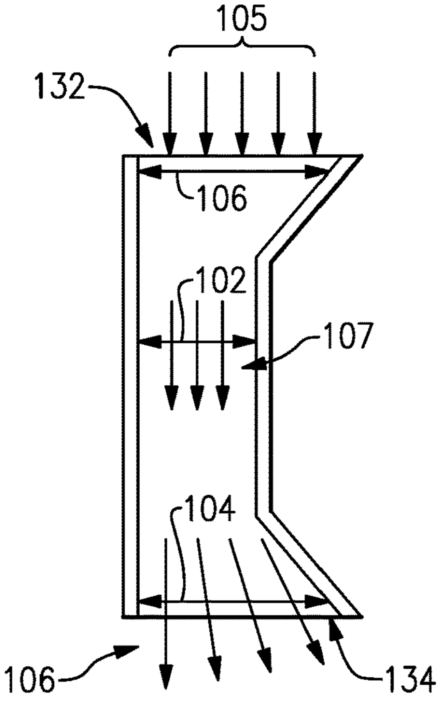
FIG. 8 is a sectional view of a leading edge cooling flow passage of the example airfoil.

Referring to FIG. 8 with continued reference to FIGS. 5, 6 and 7, the disclosed converging diverging configuration of the leading edge cooling air passage 78 induces an increase in cooling air velocity as compared to an inlet flow velocity. In this disclosed example, an inlet cooling air flow 105 includes an initial velocity. As the cross-sectional flow area decreases toward the midspan portion 88, the midspan flow 107 increases in velocity. The increased velocity provides a corresponding increase in thermal heat transfer that is targeted to the midspan portion 88. Exit cooling air flow 106 decreases in velocity in response to the expanding flow area in the end portion and through outlet 134. The increase in cooling air flow velocity in the midspan portion 88 is provided without need for additional volume and/or pressures of the inlet cooling airflow 105.

In this disclosed example embodiment, the end portions 90, 92 are substantially identical and the midspan portion 88 is substantially centered along the leading edge 70. However, the midspan portion 88 may be configured to target heat loads on the leading edge 70. The midspan portion 88 may be located in a targeted location based on engine operating parameters, such as for example, certain combustion heat profiles. Accordingly, the midspan portion 88 may be of a different length and not centered on the leading edge and remain within the contemplation and scope of this disclosure. Moreover, the end portions 90,92 may be altered to correspond with the location of the midspan portion 88.

Figure 9:
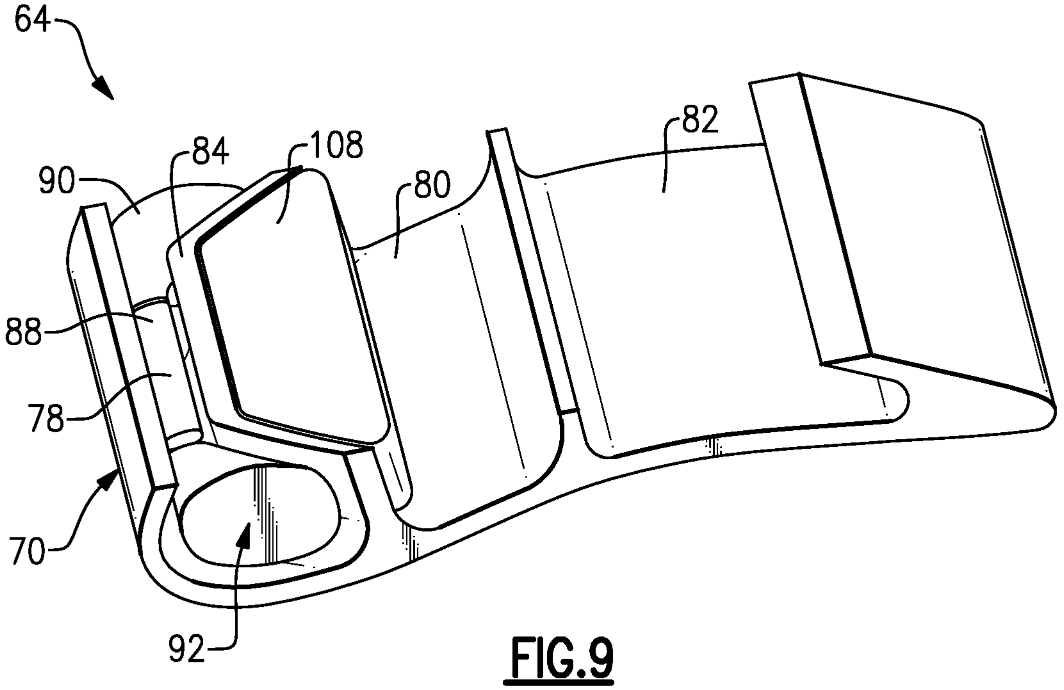
FIG. 9 is a sectional view of flow passages through the example airfoil.

Referring to FIG. 9, with continued reference to FIGS. 3 and 4, the example airfoil 64 is fabricated with CMC materials using applicable CMC fabrication methods. CMC fabrication methods can include the use of mandrels about which ceramic fibers are braided or a fabric woven with ceramic fiber is wrapped to define internal and external shapes. The airfoil is then densified by the addition of a ceramic matrix. This can be done via several methods including, but not limited to, chemical vapor infiltration (CVI), polymer infiltration and pyrolysis (PIP), and melt infiltration (MI). The mandrels are then removed either through openings or destroyed in place to yield the airfoil cavities. The structure of the forward wall 84 results in several different regions that don't allow for straight out removal of a mandrel. In this disclosed example, the leading edge passage 78 includes larger volumes within the end portions 90, 92 as compared to the midspan portion 88. The center passage includes a nested region 108 that is tucked into the space defined by the angled walls. The nested region 108 and the end portions 90, 92 preclude the use of a single mandrel for formation of these passages.

Figure 10:
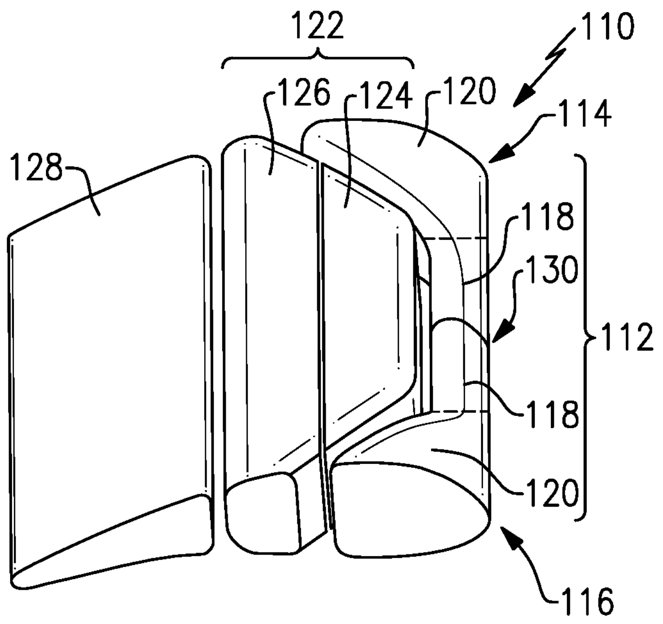
FIG. 10 is a perspective view of a mandrel assembly for forming an example CMC airfoil.
Figure 11:
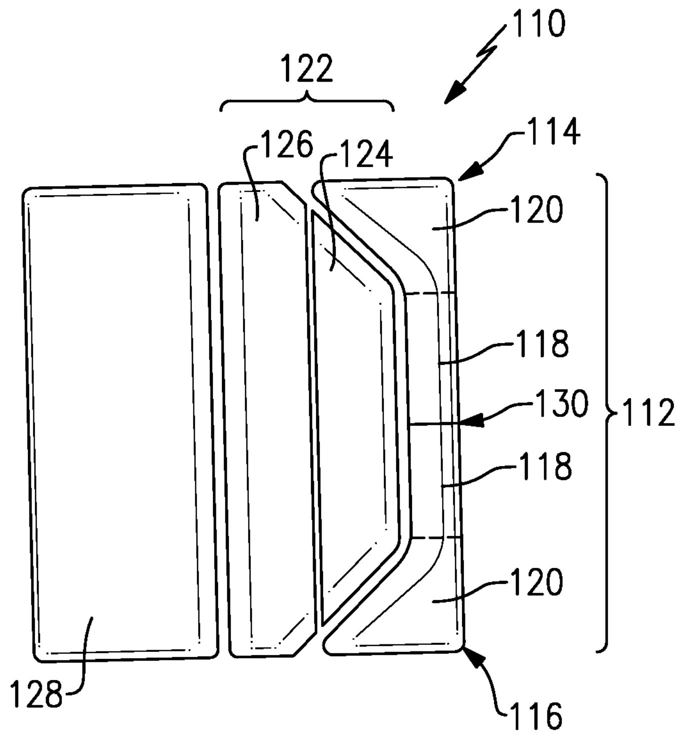
FIG. 11 is a side view of the mandrel assembly for forming the example CMC airfoil.

Referring to FIGS. 10 and 11 with continued reference to FIG. 9, an example mandrel assembly 110 is shown. The mandrel assembly 110 includes a leading edge assembly 112, a center assembly 122 and a trailing edge mandrel 128. The leading edge assembly 112 includes a first part 114 and a second part 116 separated at a joint 130. Each of the first and second parts 114, 116 are identical in this example embodiment and includes an end portion 120 and a midspan portion 118. The center assembly 122 includes a nested part 124 and a main part 126. The nested part 124 is configured to fit between the end wall portions 96A-B of the forward rib 84. (Shown in FIG. 5). The spacing between mandrel parts provide for the structure and ribs of the final airfoil form.

Figure 12:
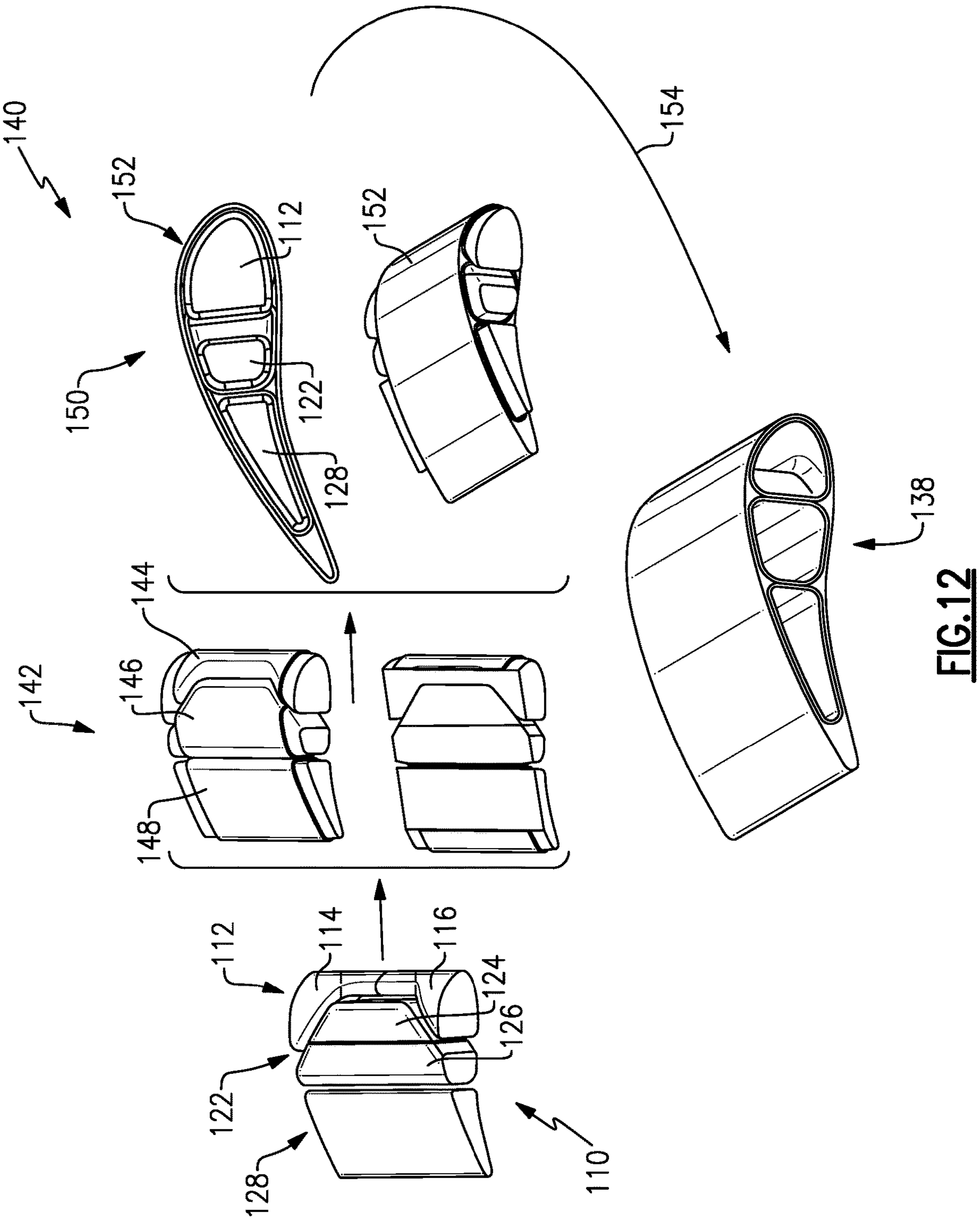
FIG. 12 is a schematic illustration of method steps for forming an example CMC airfoil.

Referring to FIG. 12 with continued reference to FIGS. 10 and 11, a method of forming a CMC airfoil is schematically shown and indicated at 140. The disclosed method includes braiding ceramic fiber or wrapping cloth woven of ceramic fiber around the mandrel assembly 110 followed by known densification and finishing steps. The specific composition of the CMC material may be of any known mixture and configuration of materials.

The disclosed method provides for wrapping of the parts 112, 122 and 128 to accommodate the separate parts and provide a desired nesting to provide a desired final completed CMC airfoil 138. In this disclosed example, a braiding and/or fabric wrapping step indicated at 142 includes applying leading edge braid and/or fabric layers over a leading edge wrap 144 is assembled around the leading edge mandrel assembly 112. A center braid/wrap 146 is assembled over the center mandrel assembly 122 and a trailing edge braid/wrap 148 is assembled to the trailing edge mandrel 128. The braids/wraps 144, 146 and 148 are braided/wrapped to correspond to the nested shapes and provide a desired relative fit between mandrel parts 112, 122 and 128.

Once each mandrel part 112, 122 and 128 is satisfactory wrapped, an overbraid or overwrap 152 is applied over all the wraps 144, 146 and 148. The overwrap 152 surrounds all the mandrel parts and provides a general completed shape of the airfoil 138. The means of assembling each of the wraps 144, 146, 148 and the overwrap 152 may be according to any known process. Moreover, although each of the wraps 144, 146, 148 and the overwrap 152 are schematically illustrated as a single layer, each may include multiple layers. Moreover, several layers may be arranged in different directions and relative orientations.

Once the wraps are applied to the mandrel assembly 110, finishing processes are performed to densify the CMC material according to predefined criteria as is schematically indicated at 154. Once the densification process is completed to a desired point, the mandrel assembly 110 is removed. Removal may include physical removal of the mandrel parts or destruction in place.

Figure 13:
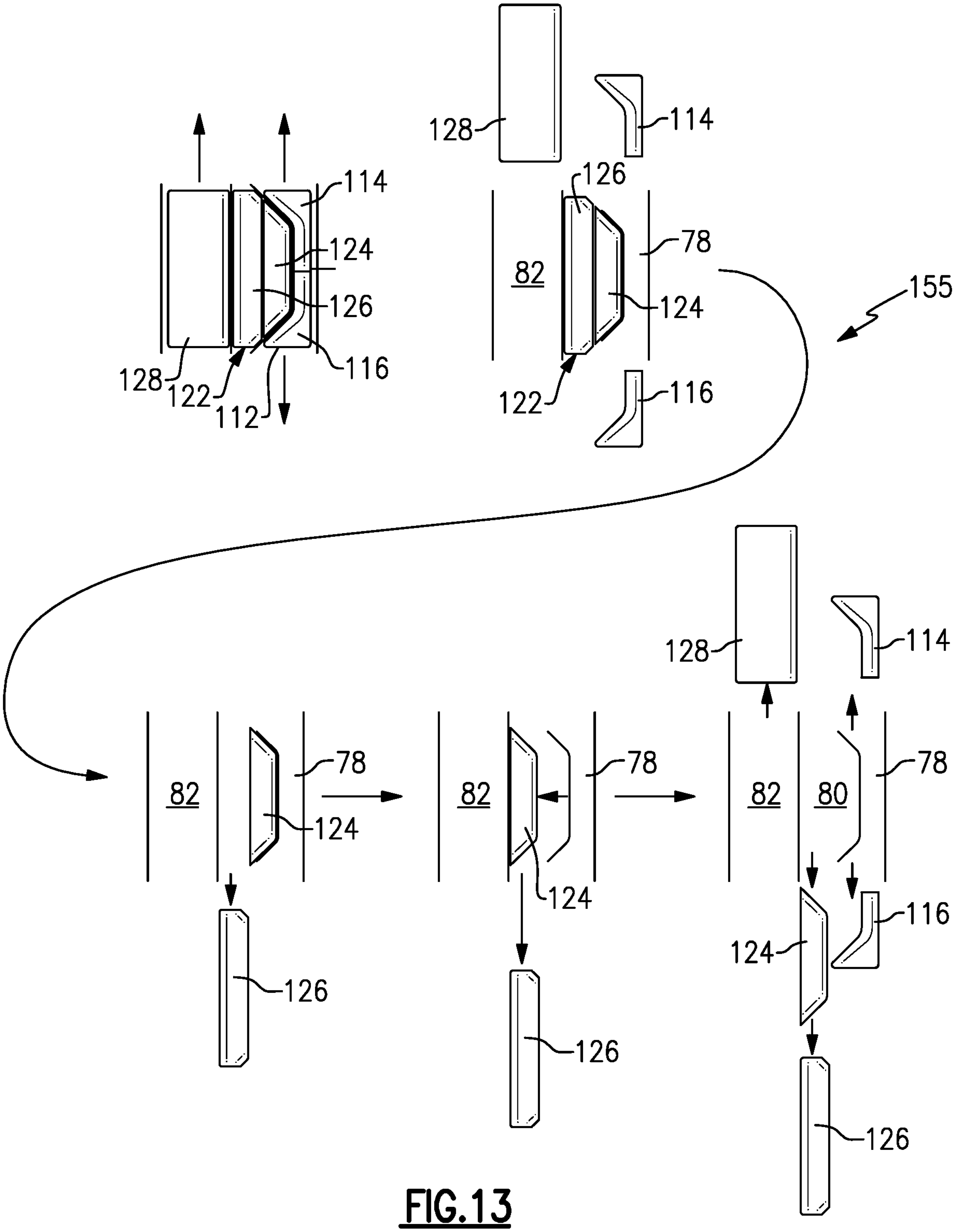
FIG. 13 is a schematic illustration of steps to remove a mandrel assembly.

Referring to FIG. 13, with continued reference to FIGS. 10, 11 and 12, physical removal of the mandrel assembly 110 is schematically shown and indicated at 155. Removal of the mandrel assembly includes removing the trailing edge mandrel 128 by pulling through one of the open ends. Removal of the leading edge mandrel assembly 122 includes pulling each of the first part 114 and the second part 116 out through corresponding ends. Removal of the center mandrel assembly 122 includes first removing the main portion 126. Once the main portion 126 is removed, the nested portion 124 is moved into the space vacated by the main part 126 and removed through the opening that the main part 126 was removed.

After the mandrel assembly 110 is removed, any additional finishing may be performed as desired to provide the resulting completed airfoil 138. It should be appreciated that the airfoil 138 may form a portion of a stator blade assembly and that other steps may be included that correspond to additional sections of the stator blade assembly.

Figure 14:
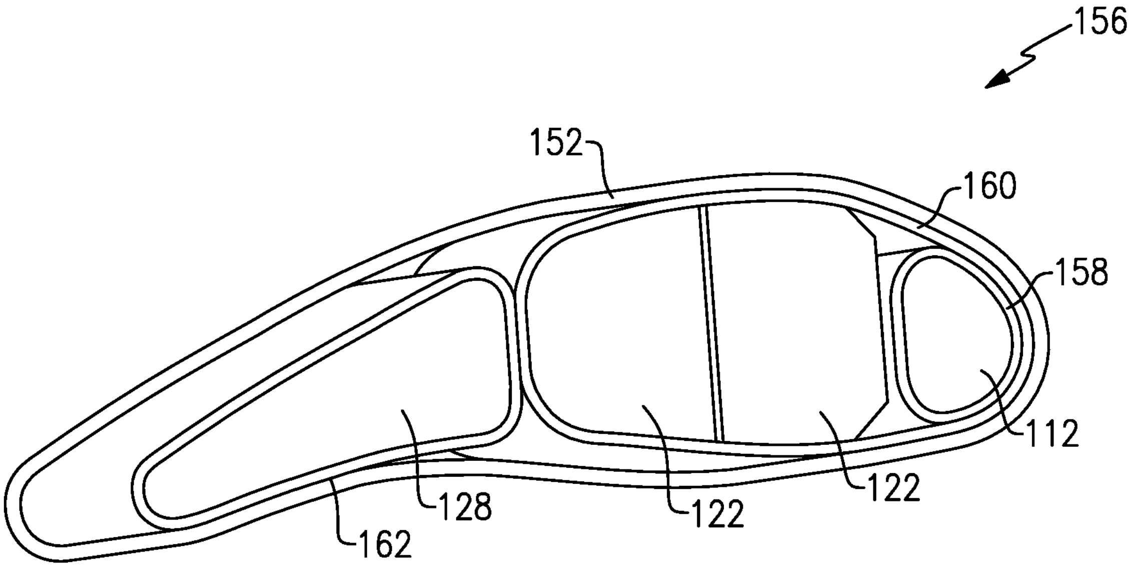
FIG. 14 is a perspective view of a mandrel assembly and step for forming an example CMC airfoil.

Referring to FIG. 14, with continued reference to FIG. 12, another example wrap embodiment is schematically indicated at 156. In this disclosed embodiment, a center braid or fabric wrap 160 is applied over a leading edge wrap 158. The overwrap 152 is applied over the braid or fabric center wrap 160 and a trailing edge braid or fabric wrap 162. The leading edge braid or fabric wrap 158 is nested within the center braid or fabric wrap 160 to accommodate the multiple parts of both the center mandrel 122 and the leading edge mandrel 112. Once the overwrap 152 is applied, the airfoil is densified and completed according to known CMC processes and finishing methods.

Accordingly, the disclosed CMC airfoil provides for targeted increases of heat transfer to address localized increases in temperatures encountered along a leading edge surface. Moreover, the disclosed mandrel assemblies provide for fabrication of the angled interior passage walls that increase cooling air velocity that provide the targeted increases in heat transfer.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A method of forming a ceramic matrix composite (CMC) airfoil comprising:

applying a leading edge braiding over a leading edge mandrel assembly with a ceramic fiber material, wherein the leading edge mandrel assembly includes a first part and a second part, wherein each of the first part and the second part include an end portion and a midspan portion, the end portion including an increasing width in a direction away from the midspan portion;

densifying the CMC material; and removing the leading edge mandrel assembly.

2. The method as recited in claim 1, further comprising;

applying a center braiding over a center mandrel assembly with a ceramic fiber material, wherein the center mandrel assembly includes a center nested part and a main part;

applying a trailing edge braiding over a trailing edge mandrel;

applying an overwrap braiding over the leading edge mandrel assembly, the center mandrel assembly, and the trailing edge mandrel; and removing the center mandrel assembly and the trailing edge mandrel.

3. The method as recited in claim 2, wherein applying the center braiding further comprises applying the center braiding over the leading edge braiding and over a portion of the center mandrel assembly.

4. The method as recited in claim 3, wherein applying the overwrap braiding comprises applying the overwrap over the center braiding that is wrapped around both the leading edge mandrel assembly and the center mandrel assembly and the braided trailing edge mandrel.

5. The method as recited in claim 2, wherein removing the leading edge mandrel assembly comprises pulling each of the first part and the second part out opposite ends.

6. The method as recited in claim 5, wherein removing the center mandrel assembly comprises removing the main part through an opening followed by moving the center part into the space vacated by the main part and removing the nested center part through the same opening through which the main part was removed.

7. The method as recited in claim 6, wherein the main part and the nested center part comprise more than one identically shaped parts.

8. The method as recited in claim 7, further comprising defining a leading edge cavity with the leading edge mandrel assembly to include a forward rib with end wall portions disposed on either end of a middle wall portion, wherein the end wall portions are angled away from the middle wall portion toward the trailing edge at each of an inlet portion and an outlet portion of the leading edge cooling passage.

9. The method as recited in claim 8, further comprising defining the leading edge cavity between a forward wall and the forward rib, wherein the forward wall defines a leading edge of a completed airfoil.

10. The method as recited in claim 8, further comprising forming an interior surface of the forward wall that is substantially straight between a first end and a second end of the leading edge cavity.

11. The method as recited in claim 9, wherein the forward wall is parallel to the middle wall portion of the forward rib.

12. A mandrel assembly for forming ceramic matrix composite airfoil, the mandrel assembly comprising:

a leading edge mandrel assembly including a first part and a second part, wherein each of the first part and the second part include an end portion and a midspan portion, the end portion including an increasing width in a direction away from the midspan portion;

a center mandrel assembly including a nested part and a main part; and a trailing edge mandrel.

13. The mandrel assembly as recited in claim 12, wherein the nested part fits within a space defined between end portions of the first part and the second part of the leading edge mandrel.

14. The mandrel assembly as recited in claim 13, wherein the first nested part includes a first side, a middle and a second side, the first side and the second side including an increasing width in a direction toward the middle.

15. The mandrel assembly as recited in claim 12, wherein the first part and the second part are identically shaped.

16. The mandrel assembly as recited in claim 12, wherein the increasing width defines an angle away from the leading edge and toward the trailing edge.

* * * * *